United States Patent [19]
Roglin et al.

[11] Patent Number: 5,150,864
[45] Date of Patent: Sep. 29, 1992

[54] VARIABLE CAMBER CONTROL OF AIRFOIL

[75] Inventors: Robert L. Roglin, Duluth; Sathyanaraya Hanagud, Atlanta, both of Ga.

[73] Assignee: Georgia Tech Research Corporation, Atlanta, Ga.

[21] Appl. No.: 763,163

[22] Filed: Sep. 20, 1991

[51] Int. Cl.⁵ .............................................. B64L 3/44
[52] U.S. Cl. ...................................... 244/219; 60/527; 244/75 R; 244/17.25; 416/24
[58] Field of Search .................. 244/203, 219, 75 R, 244/76 R, 76 C, 194, 195, 3.21, 3.24, 17.25; 416/23, 24, 39; 415/12; 60/527, 528; 337/139, 140

[56] References Cited

U.S. PATENT DOCUMENTS

| | | | |
|---|---|---|---|
| 954,682 | 4/1910 | Low et al. | 60/528 |
| 1,219,285 | 3/1917 | Gallaudet | 244/219 |
| 1,220,374 | 3/1917 | Stupar | 244/219 |
| 1,317,413 | 9/1919 | Antoni | 244/219 |
| 3,885,758 | 5/1975 | Croswell, Jr. | 244/219 |
| 4,386,574 | 6/1983 | Riolland | 244/219 |
| 4,553,393 | 11/1985 | Ruoff | 60/527 |
| 4,706,902 | 11/1987 | Destuynder et al. | 244/76 C |
| 4,725,020 | 2/1988 | Whitener | 244/76 C |
| 4,742,680 | 5/1988 | Mecca | 60/528 |
| 4,809,452 | 3/1989 | Brown | 40/417 |
| 4,811,564 | 3/1989 | Palmer | 60/527 |

Primary Examiner—Galen Barefoot
Attorney, Agent, or Firm—Hopkins & Thomas

[57] ABSTRACT

An airfoil camber control apparatus utilizes a cable of shape memory alloy affixed at its ends to a front interior portion of the airfoil. A tensioning system is connected to a rear interior portion of the airfoil and to the cable. When electrical current is applied to the cable to heat it, it returns to its remembered, shorter length, thereby applying tension to the tensioning system to alter the position of the rear portion of the airfoil relative to the front portion.

17 Claims, 3 Drawing Sheets

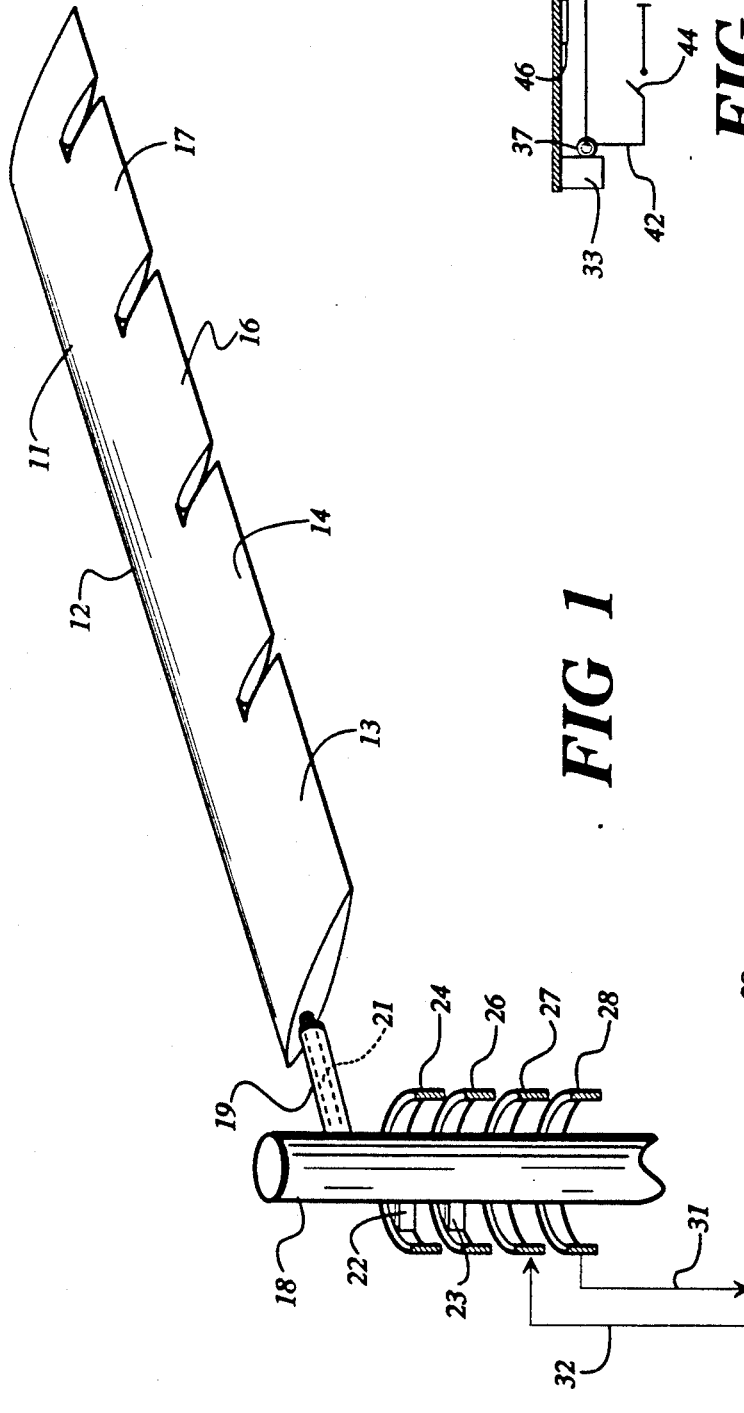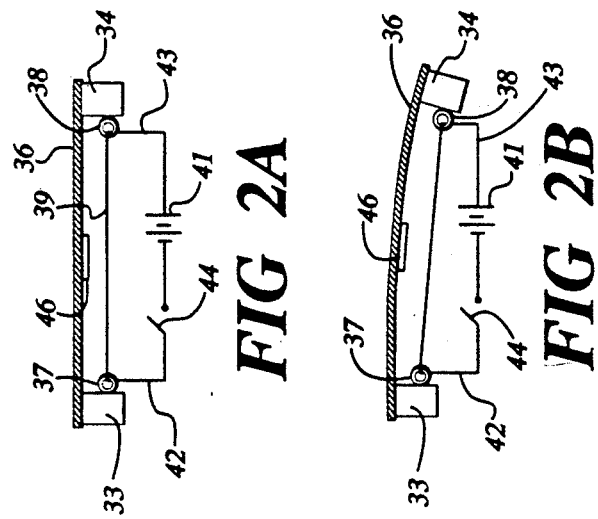

5,150,864

VARIABLE CAMBER CONTROL OF AIRFOIL

FIELD OF THE INVENTION

This invention relates to the alteration or adjustment of the operating characteristics of a shaped surface, and, more particularly, to the controlled variation in camber of an aircraft airfoil.

BACKGROUND OF THE INVENTION

The contours or camber of the airfoil surface of an aircraft such as the wings on fixed wing aircraft or the rotor blades on helicopters are, of necessity, a compromise in design. On aircraft wings the camber characteristics for lift introduce drag, and the camber characteristics for forward flight result in a decrease in lift. A similar problem is present in the rotor blades of a helicopter, where the optimum camber for vertical flight is quite different from that for hovering or for forward flight. In addition, the rotor blade, in operation, produces a twisting moment along the length thereof, which, as a consequence, produces a bending moment which is greatest at the root of the blade. This bending moment produces stress and results in fatigue of the metal of the blade especially at the root.

As a consequence most aircraft wings are designed to have a camber that approaches optimum for the anticipated normal usage, such as the straight forward constant altitude flight of an airliner, for example, and alteration of the airfoil characteristics when necessary is accomplished through flaps and tabs such as at landing and during climb and especially at takeoff.

The problems introduced by a constant camber have been long recognized and apparatuses to adjust the actual camber of the lifting surface of an aircraft are disclosed in numerous prior art patents. Thus, in U.S. Pat. No. 4,741,503 of Anderson et al a camber adjusting system is disclosed which utilizes a velocity signal to increase or decrease the camber of the airfoil during flight. An on board computer programmed with a plurality of algorithms determines, on the basis of the measured velocity, angle of attack, and altitude, whether a camber adjustment is necessary, and sends an adjusting signal to an actuation device to adjust the camber towards optimum for the measured flight parameters. U.S. Pat. No. 4,899,284 of Lewis et al likewise shows an airfoil camber adjusting system which measures flight conditions such as speed, normal acceleration, and weight, and applies signals to a calculating means which utilizes the signals, along with stored data, to compute the optimum camber for the measured operating parameters and generates command signals to trailing edge and leading edge camber adjusting means. Neither the Lewis et al nor the Anderson et al patents disclose the mechanism by which the actual camber is altered, however, the prior art is replete with arrangement for alternating the camber of airfoils.

In U.S. Pat. Nos. 1,823,069 of Stroop, 3,698,668 of Cole, 4,247,066 of Frost et al, 4,341,176 of Orrison, and 4,444,368 of Andrews are shown arrangements for varying the camber of an airfoil. Without exception the camber varying arrangements are mechanical systems of extreme complexity which add weight to the aircraft, apparently necessitate unusual maintenance and/or repair, and cannot help but be expensive. In U.S. Pat. No. 4,582,278 of Ferguson there is shown a camber adjusting arrangement having an inflatable/deflatable cavity which receives fluid under pressure. Such an arrangement is, in some respects, less complex than the aforementioned prior art arrangements, but it introduces its own complexities such as the addition of a supply of fluid under pressure, and the obvious problems of leakage.

In all of the prior art arrangements, complexity, with concomitant costs and maintenance requirements, is common to all.

SUMMARY OF THE INVENTION

The present invention is directed to an arrangement for altering the camber of an airfoil with a simple light weight apparatus having few moving parts and requiring a minimum of maintenance.

In an illustrative embodiment of the invention, the principles and features of the invention are applied to the camber control of a helicopter rotor blade. As pointed out heretofore, the amount of camber built into the blade airfoil represents a compromise. Where the camber approaches the optimum for vertical flight, it is not the preferred configuration for hovering, and vice versa. In operation, a helicopter blade tends to twist along its length, due to the velocity variations along the length which, in turn, causes variations in lift along the length of the blade, with the greatest lift being at the tip. Because the lift is greatest at the tip, a bending moment is introduced which causes flexing at the blade root. Such flexing, which is undesirable for a number of reasons, also results over a period of time in metal fatigue which can lead, ultimately, to breakage. The present invention is directed to the control of the camber of the rotor blade along its length, so that the lift is distributed along the length of the blade and the maximum lift is no longer at the tip. In addition, the camber of the blade can be optimized for either hover, vertical flight or forward flight.

The invention comprises an airfoil camber control system which comprises elongated shape memory alloy means having its ends connected to a front portion of the airfoil at two sides thereof, and tensioning means connected to a rear portion which lies in a plane substantially parallel to the plane of the first portion and which is engaged by the shape memory alloy means. Means are provided for applying control signals to a power supply for applying current to the shape memory means to cause it to revert towards its remembered shape, in this case, a shorter length, which in turn causes the tensioning means to pull on the rear portion of the airfoil to alter the angular relationship of the first and second portions and thereby alter the curvature of the surface of the airfoil.

In the arrangement of the invention in a first illustrative embodiment thereof, the rotor blade has a plurality of flap members spaced along the trailing edge thereof. Within the hollow core or torque tube of the blade, as defined by front and rear walls lying in substantially parallel planes and by the airfoil skin overlying the walls the deflection of each flap is independently controlled by a mechanism which comprises a wire cable of a material having a shape memory, i.e., a shape memory alloy, which, upon heating, reverts to its remembered shape which, in this case, is a shortened length. An example of the use of shape memory alloys is shown in U.S. Pat. No. 4,809,452 of Brown. The cable is anchored at each end to the front wall of the hollow core and at the approximate midpoint of its length there is located a tensioning eye ring which may be free to slide on the cable. Anchored to fixed mounting points on the rear wall of the hollow core at each end of the flap and adjacent to the bottom edge of the wall is a tension wire which passes through an eye ring affixed to the front wall, a second eye ring mounted to the rear wall adjacent the lower edge thereof, through the tensioning eye ring, through a third eye ring mounted to the rear wall adjacent the lower edge thereof, a fourth eye ring affixed to the front wall, and then to the fixed mounting point on the rear wall adjacent the lower edge.

When electric current is applied to the shape memory alloy cable it contracts, applying tension to the tensioning wire device, which, in turn, pulls the lower edge of the rear wall inwardly of the core causing the plane thereof to be tilted, thereby increasing the curvature of the skin and lowering the flap. When the flap is lowered the camber of that area of the rotor where the flap is located is altered.

As pointed out, the top surface of the wing comprises, over the core, a thin skin of aluminum or whatever material the rotor is made of, and one or more strain gauges are affixed to the inner surface of the skin. The deflection of the flap sets up a tensile strain on the skin and the detectors measure the extent of the strain and apply signals to a control circuit such as an onboard computer, which stops the process when the desired camber change is realized. In addition, manual controls forming, for example, an adjunct to the computer, allow manual adjustment of the flaps to achieve the desired characteristics as sensed by the aircraft gauges and the pilot's sensory response to the flight conditions.

The various features of the present invention will be more readily apparent from the following detailed description, read in conjunction with the accompanying drawings.

BRIEF DESCRIPTION OF THE DRAWINGS

FIG. 1 is a perspective view of a single helicopter rotor blade showing the arrangement for applying electrical power to the elements of the invention and for receiving signals from elements of the invention;

FIG. 2A is a diagrammatic representation of the operating principles of the present invention, shown in a non-operative state;

FIG. 2B is a diagram of the arrangement of FIG. 2A in operation;

DETAILED DESCRIPTION

Figure 3:
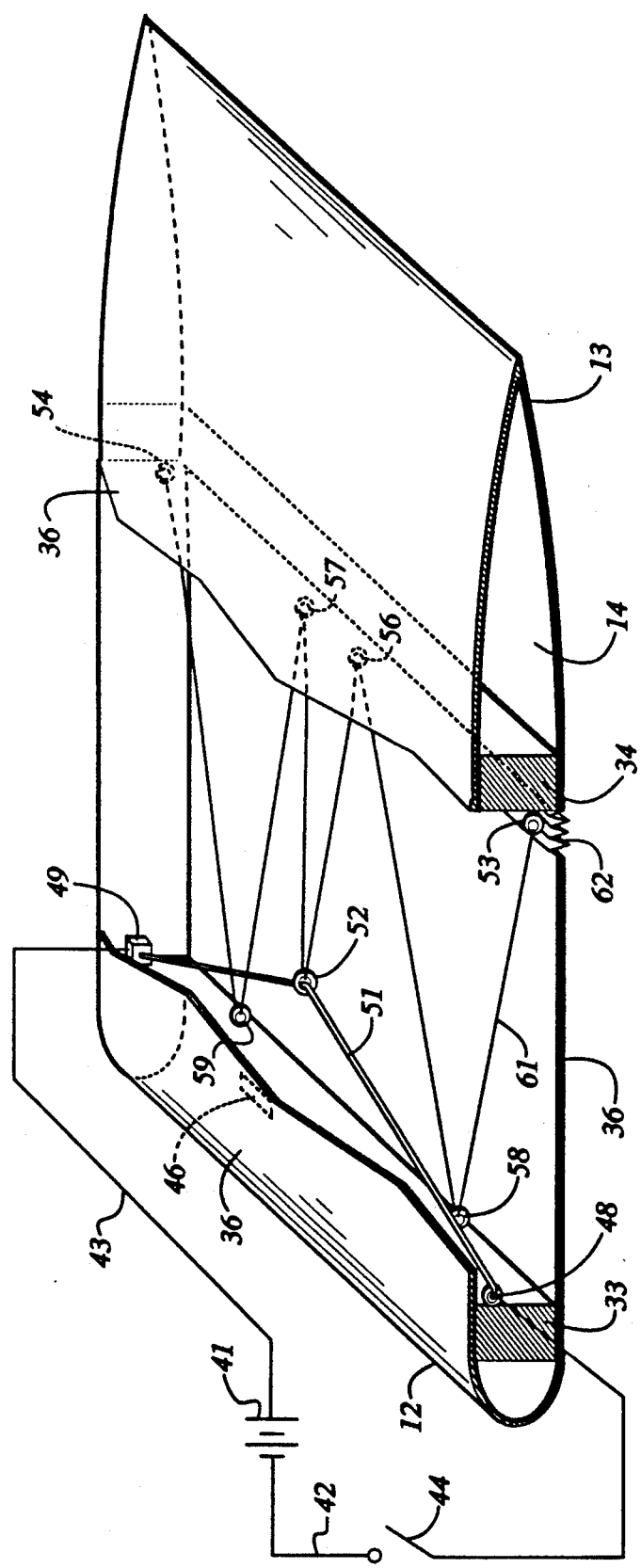
FIG. 3 is a perspective, partially cutaway view of a first preferred embodiment of the invention in a single flap of the rotor blade.

In FIG. 1 there is shown a single helicopter main rotor blade 11 having a leading edge 12 and a trailing edge 13. Disposed along the length of trailing edge 13 are first, second, and third camber adjusting flaps 14, 16, and 17 respectively. The blade 11 is mounted to a drive shaft 18 by suitable mounting means, shown here schematically as a mounting bar 19. Electrical power to the flaps, and signals from sensors in the flaps 14, 16, and 17, are passed along a multi-conductor cable 21, down shaft 18, either exteriorly or interiorly, to a series of brushes, only two of which, 22 and 23, are shown. The series of brushes exemplified by brushes 22 and 23, bear against a plurality of slip rings 24, 26, 27 and 28 which surround shaft 18 and are mounted to a fixed portion of the helicopter. It is to be understood that the electrical connections many take any of a number of forms, that shown here being by way of example as one preferred embodiment. Some of the slip rings, such as 27 and 28, are connected to a computer 29 through input lead 31 and output lead 32. In actual practice, there will be a large number of slip rings connected to the computer, as will be apparent hereinafter, as well as some slip rings connected to a power supply, not shown in FIG. 1, under control of the computer.

In FIGS. 2A and 2B there are shown, diagrammatically, the operational principles upon which the present invention is based. First and second walls 33 and 34 are overlaid by a thin skin 36, which represents the skin of the helicopter rotor, of aluminum or other suitable material approximately 0.040 inches thick. Wall 33 has affixed thereto, adjacent the bottom edge, an eye ring 37 and wall 34 has affixed thereto, adjacent the bottom edge, an eye ring 38. A wire member 39 of a shape memory alloy, such as, for example, NITINOL ®, extends between rings 37 and 38 and is affixed thereto. A power supply 41 is provided for applying current through wire 39 through leads 42 and 43 through a switch 44, shown open in FIG. 2A. Affixed to the underside of skin 36 is a strain gauge 46, preferably piezoelectric. With switch 44 open, no current is applied to wire 39, and skin 36 remains unstressed.

In FIG. 2B, switch 44 is closed, and current is applied to wire 39, causing it to heat up. It is a characteristic of shape memory alloys (SMA) that, when heated, they return to the remembered shape, which, in the present case, is a shorter length. Thus, when wire 39 contracts, it pulls the lower edge of wall 34 inward, as shown, causing skin 36 to bend, thus creating a tensile stress in skin 38. Sensor 46 measures the amount of stress and generates a signal which is applied, for example, to the computer 29 of FIG. 1, which will open switch 44 when the desired degree of stress, and hence bending, of skin 36 is attained.

The operative principles illustrated in FIGS. 2A and 2B are applied to the camber control arrangement of the present invention in a first preferred embodiment thereof as illustrated in FIG. 3. FIG. 3 depicts a single flap 14 of the array of flaps 14, 16 and 17 shown in FIG. 1. Flaps 16 and 17 are substantially identical to flap 14, hence the details of flap 14 are common to flaps 16 and 17 also. For simplicity, where feasible, the reference numerals of FIGS. 1 and 2A and 2B are used in FIG. 3 to identify like components.

In the flap 14 of FIG. 3, walls 33 and 34 define a hollow core or torque tube 47, overlaid by skin 36. Affixed to front wall 33 at one side of flap 14 is an eye ring, and at the other side of flap 14, and affixed to wall 33, is an adjustable tensioning member 49. An SMA cable 51, which may, for example, comprise a NITINOL ® wire bundle of 64 strands of 0.01 in diameter NITINOL ® wires, is affixed at one end to eye ring 48. The other end of cable 51 is mounted to tensioning member 49. Approximately at the mid-point of cable 51 is a tensioning eye ring 52 which may be connected to cable 51, or which may be free to move with respect to cable 51. While an eye ring is shown, element 52 may comprise any of a number of movable type retaining members.

Mounted to rear wall 34 adjacent its bottom edge, at one side of flap 14, is an eye ring 53, and at the other side of flap 14 a corresponding eye ring 54, shown in dotted outline. Also mounted adjacent the bottom edge of wall 34, and substantially equally spaced from each other and from eye rings 53 and 54 is a pair of retaining members or eye rings 56 and 57. Mounted on front wall 33, preferably adjacent the bottom edge thereof, is a pair of retaining members or eye rings 58 and 59, preferably equally spaced from each other and from the sides of the flap 14. A tensioning wire 61, which may be, for example, one-quarter inch ($\frac{1}{4}$") diameter high tensile strength steel has one end affixed to eye ring 53, is threaded through rings 58, 56, 52, 57 and 59, and has its other end affixed to ring 54, thereby forming a zig-zag pattern, as seen in FIG. 3. Wire 61 is only fixed at its ends, and is free to move or slip in all of the retaining members or rings except rings 53 and 54.

In operation, when switch 44 is closed and current passes through cable 51, it will contract as it is heated, thereby pulling on wire 61 through tensioning ring 52. As a consequence, the lower edge of rear wall 34 is pulled inward toward wall 33, thus bending the trailing edge 13 of flap 14 downward, and stressing skin 36. In order that the lower edge of wall 34 may move inwardly, a resilient strip 62 of elastomeric material or accordion pleated skin is located adjacent the lower edge of wall 34 along the length thereof and allows the lower edge to move inwardly. As was discussed in connection with FIGS. 2A and 2B, strain gauge 46, only one of which is shown although there may be several, measures the flexing or strain on skin 36 and generates a signal for processing by the computer, or for monitoring by the pilot. When the desired camber is achieved the strain gauge sends no further signal, and the computer halts the process. It can be appreciated that upon cessation of current through cable 51, it will start to return to its original non-operative length. Any such movement, however, will be detected by gauge 46 and the computer will send sufficient current through cable 51 to prevent this from happening, where desired.

Figure 4:
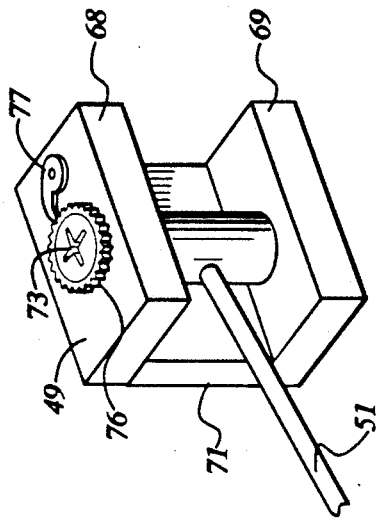
FIG. 4 is a partially cut away plan view of another preferred embodiment of the invention.

In FIG. 4 there is shown in plan view a single flap 16 illustrating a second preferred embodiment of the invention. In the arrangement of FIG. 4, SMA cable 51 is affixed at one end, at one side of flap 16, to a fixed eye ring 48 mounted on the rear of front wall 33. The other end of cable 51 is connected to adjustable tensioning member 49, as shown. Mounted on rear wall 34 adjacent the lower edge thereof and approximately at the midpoint of the width of flap 16 is a fixed eye ring 63 through which cable 51 passes. A plurality of sensors or strain gauges 64, 66 and 67 are shown by way of example. The actual number and location of the plurality of strain gauges in both the embodiments of FIGS. 3 and 4 is a matter of design and is dependent on a number of factors.

In operation, when current is applied to cable 51 it contracts, thereby pulling on ring 63 and hence the lower edge of wall 34, thereby altering the shape and camber of flap 16. Ring 63 constitutes a tensioning means in the same way as wire 61 and its associated eye rings in FIG. 3.

Figure 5:
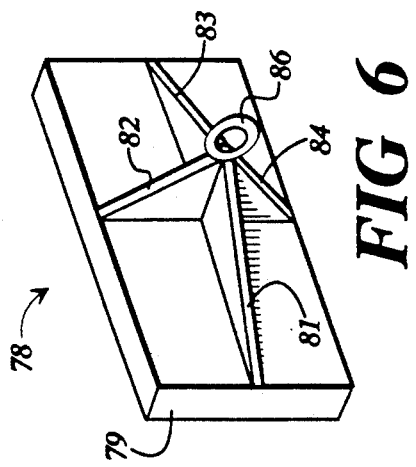
FIG. 5 is a perspective view of a tensioning device for use with the apparatus of the invention.

In FIG. 5 there is shown the tensioning element 49 in greater detail. Basically, element 49 comprises upper and lower plates 68 and 69, joined by a mounting plate 71. A rotatable shaft 72 is mounted with a first end rotatable in plate 68 and the second end rotatable in plate 69. The first end has adjusting slots 73 cut therein so that shaft 72 may be rotated. Cable 51 is connected to shaft 72 by any suitable means, such as being passed through a hole in shaft 72, and the tension on cable 51 can be increased by the rotation of shaft 72, in the manner of the tuning arrangement for a string musical instrument. Inasmuch as a great deal of tension will be applied against shaft 72 in operation, suitable means, such as a ratchet 76 and pawl 77, attached to the end of shaft 72, as shown, may be used to prevent any unwanted rotation of shaft 72 in operation. Ratchet 76 and pawl 77 are shown here by way of example, it being understood that any of a number of ways for preventing unwanted rotation of shaft 72 may be used.

Figure 6:
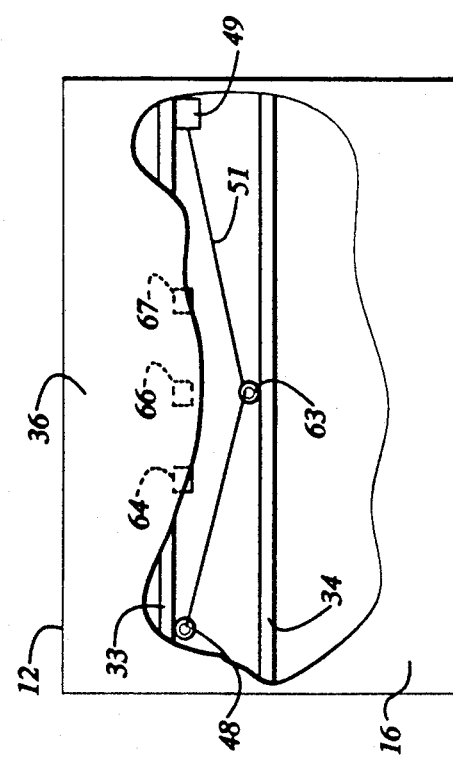
FIG. 6 is an eye ring mounting arrangement for use in the invention.

In FIG. 6 there is shown an arrangement for mounting the eye rings, such as ring 63 in FIG. 4. The mount 78 comprises a mounting plate 79 for attachment to the wall, and four triangular vanes 81, 82, 85 and 84 mounted as by welding on the front face of plate 79 at right angles to each other. The eye ring 86 is mounted, as by welding, to the point formed by the apices of the four triangles. The tensile forces to which the ring 86 is subjected in operation are considerable, and it is essential that the eye ring mounting be strong enough to withstand these forces. The mount 78 of FIG. 6 is an example of a sufficiently sturdy mount to withstand the forces on the ring 86. It is to be understood that other mounting arrangements could also be used in place of that shown in FIG. 6.

Figure 7:
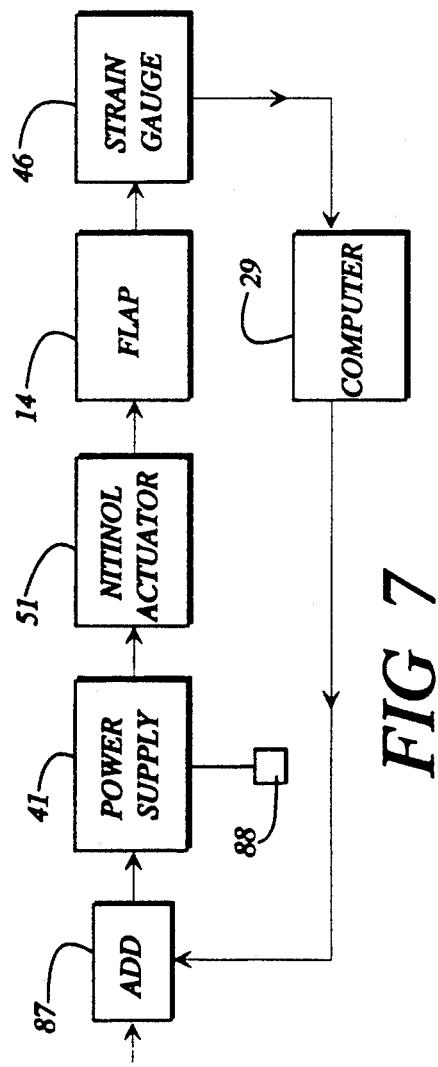
FIG. 7 is a block diagram of the basic electrical arrangement of the invention.

FIG. 7 is a simple, block diagram showing the electrical relationship of the parts. For simplicity, the same reference numerals as used in FIGS. 1, 2, and 3 identify like elements in FIG. 7. As seen in FIG. 7, any movement or strain on the skin of flap 14 is detected by gauge 46 which generates a signal that is applied to computer 29. Computer 29 generates a control signal which is added to any pre-existing deflection signal in adder 87, and the output of adder 87 is applied to power supply 41, which, in turn, supplies the proper amount of current to NITINOL® actuator 51. Power supply 41 is shown with a manual adjusting knob 88 for manual control of the camber variation, which can also be used in calibrating the system.

From the foregoing, it is readily apparent that the present invention, as embodied in first and second preferred arrangements, constitutes a method and apparatus for varying the camber of an airfoil with a minimum of moving parts in a simple, reliable, virtually maintenance free arrangement. The foregoing has been for purposes of illustration of the principles and features of the present invention. Numerous modifications may occur to workers in the art without departure from the spirit and scope of the invention.

We claim:

1. An apparatus for altering the curvature of a curved surface of a member wherein the member has first and second laterally extending substantially parallel spaced walls and spaced side portions, said apparatus comprising:

an elongated means of a shape memory alloy having first and second ends, said first end being connected to the first wall of the member at one side thereof, and said second end being connected to the first wall of the member at a second side thereof, tension means connected to the second wall of the member, said tension means including means for engaging said elongated means, and actuating means for causing at least a portion of said second wall to be moved relative to said first wall, said actuating means comprising means for causing said elongated means to revert to its remembered shape to apply tension to said tension means to alter the curvature of the curved surface of the member.

2. An apparatus as claimed in claim 1 wherein the member is covered by a skin, and including means for measuring the stress on the skin when said curvature of the curved surface is altered.

3. An apparatus as claimed in claim 1 wherein the second wall has a laterally extending lower edge, and said tension means is mounted on said second wall adjacent the lower edge.

4. An apparatus as claimed in claim 3 wherein said tension means comprises an eye ring affixed to said second wall approximately midway between the spaced side portions.

5. An apparatus as claimed in claim 1 wherein said means for causing said elongated means to revert to its remembered shape comprises means for applying an electric current to said elongated means.

6. An apparatus as claimed in claim 1 and further comprising means for adjusting the tension of said elongated means.

7. An apparatus as claimed in claim 1 wherein said tension means comprises an elongated wire member having first and second ends affixed to said second wall.

8. An apparatus as claimed in claim 7 wherein said second wall has a laterally extending lower edge, and said first and second ends of said wire member are affixed to said second wall adjacent said lower edge.

9. An apparatus as claimed in claim 8 wherein said tension means further comprises a retaining means mounted on said elongated means to which said wire member is connected.

10. An apparatus as claimed in claim 9 wherein said retaining means comprises a ring through which said elongated means and said wire member are threaded.

11. An apparatus as claimed in claim 9 and further comprising a first plurality of retaining members spaced substantially equidistant from each other and affixed to said second wall and a second plurality of retaining members spaced substantially equidistant from each other and affixed to said first wall wherein said wire member is connected sequentially and alternately to the retaining members in said first plurality and said second plurality to form a zig-zag configuration.

12. An apparatus as claimed in claim 11 wherein said retaining members in said first and second pluralities are slip rings through which said wire member is threaded.

13. An apparatus for varying the camber of an airfoil having a hollow core formed by front and rear substantially parallel wall members having upper and lower elongated edges and being covered with a thin skin, said apparatus comprising:

an elongated shape memory alloy cable having its ends anchored to the front wall member,
a tensioning ring on said cable.
an elongated tension wire member anchored at its ends by first and second anchoring means to the rear wall member adjacent the lower elongated edge,
a first retaining member affixed to the front wall,
a second retaining member affixed to the rear wall,
a third retaining member affixed to the rear wall,
a fourth retaining member affixed to said front wall,
said wire member extending from said first anchoring means sequentially to said first retaining member, said second retaining member, said tensioning ring, said third retaining member, said fourth retaining member, and to said second anchoring means.

14. An apparatus as claimed in claim 13 wherein said second and third retaining members are affixed to the rear wall adjacent the lower edge thereof.

15. An apparatus as claimed in claim 13 wherein said first, second, third and fourth retaining members are slip rings.

16. An apparatus as claimed in claim 13 and further comprising means for applying electrical current to said cable.

17. An apparatus as claimed in claim 16 and further comprising means for controlling the amount of electrical current applied to said cable.

* * * * *